J. B. TILLINGHAST.
Modes of Training and Securing Grape-Vines.
No. 155,995.  Patented Oct. 13, 1874.
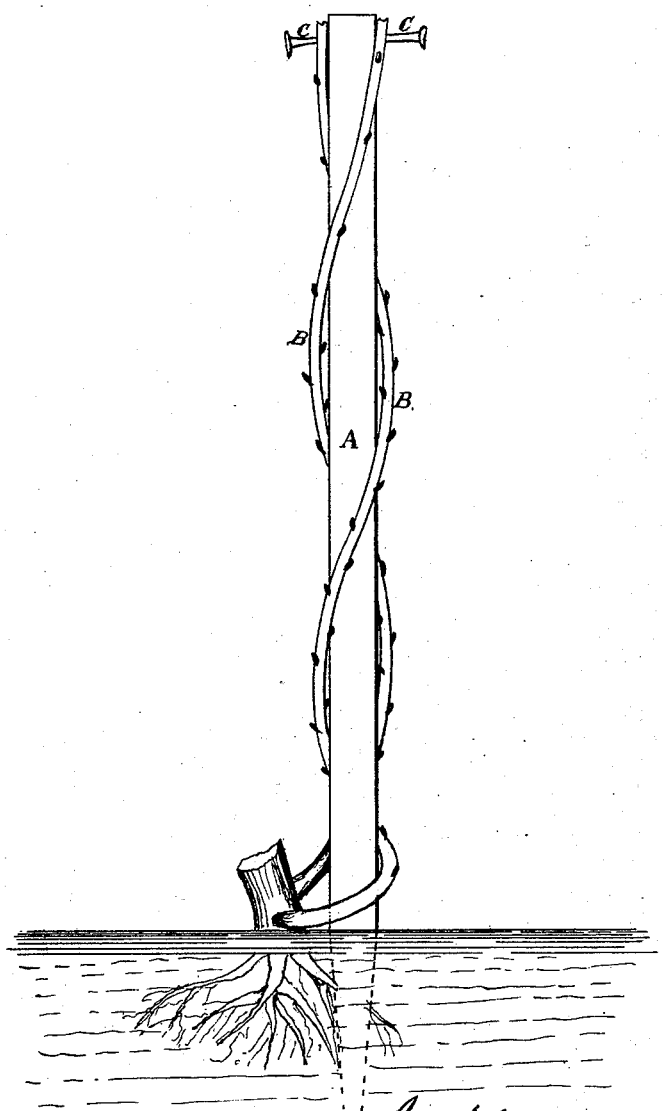

UNITED STATES PATENT OFFICE.

JOSEPH B. TILLINGHAST, OF INDIANAPOLIS, INDIANA.

IMPROVEMENT IN MODES OF TRAINING AND SECURING GRAPE-VINES.

Specification forming part of Letters Patent No. 155,995, dated October 13, 1874; application filed February 15, 1873.

*To all whom it may concern:*

Be it known that I, JOSEPH B. TILLINGHAST, of Indianapolis, Marion county, and State of Indiana, have invented an Improved Mode of Training and Securing Grape-Vines to Stakes, of which the following is a specification:

The grape-vines are planted in rows, in the usual manner, and at each a stake is set, said stakes being previously pointed, and the lower end steeped in hot coal-tar. At the proper time the vines are cut down close to the ground, and, as nearly as practicable, two branches are allowed to grow. These branches are trained spirally around the stake with a view to dispose the lateral and fruit stalks in the most advantageous manner to the influence of the light and air, and is a mode of training that will readily commend itself to grape-growers.

Besides the advantages above described the spiral training tends to check the too rapid growth of the main branches, and thereby to cause better development of the first spurs.

When trained to the top of the stakes the main branches are, at the proper season, cut off at that point, and their upper ends secured to the stake by means of nails of suitable size driven through the vines into the stake, four-penny nails generally being found the most useful.

This mode of securing the vines to the stakes, combined with the spiral training, is found in practice to hold them up with greater certainty and with less injury than by use of strings.

Nails may be driven through the vines at any place desired, but one through each, near the top, will generally be found sufficient.

Another advantage of this mode of training and securing the vines is, that when the stakes require renewing this may be done with greater facility than when the vines are tied with strings.

The drawing is a representation of the mode of training and securing the vines, A being the stake, B the vines, and C the nails by which the vines are secured to the stake.

I make no claim to training the vines spirally around the stake, in itself considered, as this has, in some measure, been done before.

I claim as my invention—

The mode of training and securing grape-vines to stakes, substantially as described.

JOSEPH B. TILLINGHAST.

Witnesses:
  WALTER C. DRYDEN,
  I. S. FORBES.